Oct. 21, 1947.  F. C. P. HENROTEAU  2,429,462
OPTICAL SYSTEM FOR CORRECTION OF TUBE WALL DISTORTION
Filed Jan. 27, 1944
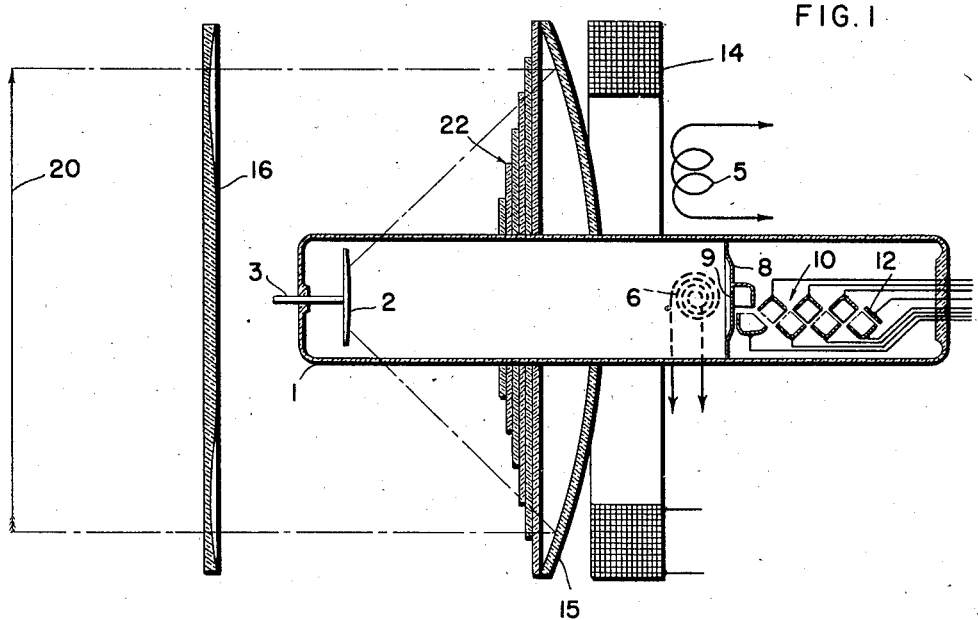
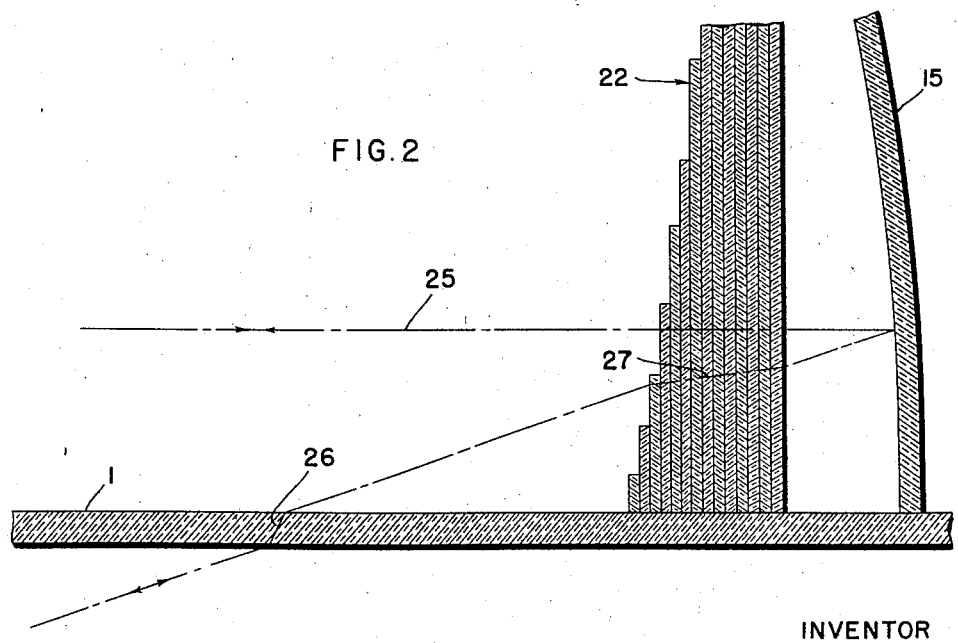
INVENTOR
FRANCOIS C. P. HENROTEAU
BY *Edwin H. Martin*
ATTORNEY Patented Oct. 21, 1947

2,429,462

UNITED STATES PATENT OFFICE 2,429,462

OPTICAL SYSTEM FOR CORRECTION OF TUBE WALL DISTORTION

François Charles Pierre Henroteau, Fort Wayne, Ind., assignor to Farnsworth Television and Radio Corporation, a corporation of Delaware Application January 27, 1944, Serial No. 519,882

2 Claims. (Cl. 178—7.2)

This invention relates generally to electron optical devices and more particularly to light energy-converting systems comprising Schmidt optical systems.

It has been found to be advantageous in television systems and in other electron optical systems to utilize in combination with either image transmitting tubes or image reproducing tubes a Schmidt optical system for collecting light from an image or for projecting an image for visual observation. Several alternative methods of associating electron tubes with Schmidt optical systems have been suggested and among them is that shown in the United States Patent application of Christian C. Larson, Serial No. 508,894, filed November 4, 1943. In accordance with the invention disclosed in that application, there is provided a cylindrical electron tube together with a spherical mirror and a correcting plate for determining an optical path between an electrode of the tube and a plane in space. The spherical mirror is disposed about the exterior of the cylindrical envelope of the tube whereby the optical path between the electrode of the tube intersects the envelope at an acute angle. By reason of this characteristic of the optical system, a certain degree of distortion occurs because of refraction between the interior and exterior surfaces of the tube envelope. This refraction increases from a minimum to a maximum as the angle of incidence of the light path between the electrode and the mirror surface decreases from a maximum to a minimum. Consequently, the light image formed by the optical system is distorted in accordance with the degree of refraction of light from the different portions of the image.

Accordingly, the principal object of this invention is to provide, in an electron optical device comprising an electron tube and a Schmidt optical system, a method and apparatus for correcting distortion of the image formed by said optical system.

Another object of this invention is to provide in an electron optical device comprising a Schmidt optical system, a method and apparatus for correcting distortion of the optical image resulting from refraction effects caused by the optical system.

In accordance with this invention there is provided an optical system adapted for use with either a television transmitting tube or a television receiving tube. This system consists of a spherical mirror together with a correcting lens for correcting aberration of the light reflected by the mirror. For use in conjunction with this particular type of optical system, there is provided a cylindrical electron tube, the envelope of which comprises optical glass. Within the tube there is provided an opaque electrode which may be photosensitive or may have the property of converting electrical energy into light energy. The spherical mirror is provided with an aperture through which the electrode end of the tube may be inserted in such a manner that light may be reflected by the mirror to impinge either upon the surface of the electrode or on the surface of a viewing screen. The correcting lens is disposed between the object or viewing screen and the mirror whereby spherical aberration may be corrected. The optical path between the spherical mirror and the opaque electrode intersects the cylindrical envelope at an acute angle whereby the light reflected by the mirror or emitted by the electrode is distorted by refraction occurring between the interior and exterior surfaces of the envelope. For correcting the distortion caused by refraction, there is provided a disc disposed around the envelope between the mirror and the tube electrode. The disc is graduated in thickness from a minimum adjacent the periphery of the mirror to a maximum at the surface of the tube envelope. As the angle of incidence of the optical path with respect to the tube envelope decreases the refraction between the exterior and interior surfaces of the envelope increases and the refraction in the correcting disc increases in the opposite sense completely to compensate the distortion effects produced by the envelope. The correcting disc may consist of a plurality of discs substantially equal in thickness and graduated in diameter, or the disc may be molded or ground to have the required thickness at various points as described above. The invention is applicable to any form of electron optical system such as a dissector tube or an iconoscope in combination with the Schmidt optical system or a kinescope in combination with a Schmidt optical system or an image-converting tube in combination with a Schmidt optical system. By an image-converting tube is meant one wherein visible or invisible optical images are converted to electron images and reconverted on a fluorescent screen to a visible optical image.

For a better understanding of the invention, together with other and further objects thereof, reference is made to the following description, taken in connection with the accompanying drawings, and its scope will be pointed out in the appended claims.

In the accompanying drawings:

Fig. 1 is a cross-section of a dissector tube and optical system embodying the invention.

Fig. 2 is an enlarged, detailed cross-sectional view of the tube envelope, the correcting disc and the spherical mirror shown in Fig. 1.

Referring to Fig. 1 of the drawings, there is shown, purely by way of example, a picture-analyzing tube of the dissector type including an envelope 1, and a photosensitive cathode 2 supported from the envelope by a conductor 3. Envelope 1 comprises optical glass ground to provide minimum distortion of light rays passing therethrough. For deflecting the electron stream emitted by cathode 2, there is provided a pair of conventional deflection coils 5 and 6. Electrode 8 is suitably supported from the envelope 1 to block the flow of electrons from cathode 2 except those electrons passing through aperture 9 whereby to obtain scanning of the electron image in accordance with well known practice. The electron flow through aperture 9 impinges on the inner secondary electron-emissive surface of the initial electrode 8 of an electron multiplier 10 of conventional construction. There is provided a final electrode 12 to which a video-signal channel may be connected. For focusing the electron stream at the aperture 9 of the electron multiplier, there is provided a focusing coil 14.

The optical system for collecting and focusing an image on cathode 2 consists of a spherical mirror 15 and a correction lens 16. The surface of cathode 2 is formed to conform in an optical sense with the surface of mirror 15. The mirror 15 is constructed to have an aperture for receiving the tube envelope 1 as illustrated in the drawings whereby the mirror and tube may be adjusted with such relation to one another that all the light collected from image 20 will impinge on cathode 2. The correction lens 16 is so ground and so disposed with respect to mirror 15 that the effects of spherical aberration in the light reflected by mirror 15 is corrected.

Inspection of Fig. 1 makes it obvious that parallel light rays impinging on mirror 15 and reflected to electrode 2 penetrate the tube envelope 1 at an acute angle whereby refraction occurs between the interior and exterior surfaces of the envelope. This refraction increases as the angle of incidence of the light ray with respect to the tube envelope decreases. For correcting the effects of refraction, there is provided a disc 22 of light pervious material such as glass or certain plastic materials. Disc 22 is graduated in thickness as shown in the drawings and particularly in Fig. 2 by providing successive discs of decreasing diameter from the periphery of the disc to the surface of the tube envelope. In Fig. 1 only a few discs are shown for purposes of illustration, while in the enlarged view shown in Fig. 2 there is illustrated a suitable number of discs for an actual working embodiment of the invention. It is not intended that such a correction disc shall be limited to this particular form of construction as it will be obvious to those skilled in the art that a unitary ground disc or a molded disc may be provided to have graduated thickness as illustrated in the drawings.

Considering the operation of this invention, light from an image 20 is collected on spherical mirror 15. As is well known in the optical art, a spherical reflecting surface causes a distortion of the reflected image known as spherical aberration. Therefore, the light passing between image 20 and mirror 15 is predistorted in lens 16 to correct for spherical aberration. At the surface of mirror 15, light rays from image 20 are reflected and focused on the photosensitive cathode 2 which by reason of its curvature responds to the reflected light to create an undistorted electron image representative of the original image.

As is well known in the television art, the electron image emitted by cathode 2 may be focused by focusing coil 14 on the aperture 9 in electrode 8. Also the electron image may be deflected by deflecting coils 5 and 6 to provide scanning whereby each elemental area of the electron image is scanned at aperture 9. Thus the electron image is analyzed point by point and converted into a continuous video signal in multiplier 10 whereby at output electrode 12 there is obtained an amplified video signal representative of the original light image 20.

Referring more particularly to Fig. 2 of the drawings, there is shown for purposes of illustration a light ray 25 which originates either at a point in space in the case of a transmitting tube or at a point on the electrode 2 in the case of a picture reproducing tube. Assuming for purposes of illustration that the light ray originates on the electrode 2, it first intersects the tube envelope 1 at the interior surface thereof. Because of the refraction effects which occur when light is transmitted through an optically pervious material, the light ray travels in a direction substantially 90° displaced with respect to the interior surface of envelope 1 as at 26. When the light ray impinges on the exterior surface of envelope 1, it is transmitted in a direction parallel to that in which it first intersected the interior surface of the envelope but it is displaced with respect to its original path. Without some form of correction, the optical image formed by the system is distorted either at a point in space or on the surface of the electrode 2 depending upon the origin of the image. Disc 22 is disposed between mirror 15 and electrode 2 and graduated in thickness so that when light ray 25 impinges on the outer surface of disc 22 as at 27, it is again refracted sufficiently to cause the ray to assume its original path toward the mirror. Disc 22 being graduated in thickness to correct the increasing distortion effects as the angle of incidence of the ray with respect to the tube envelope decreases, all parts of the optical image are reformed without any distortion either at electrode 2 or at a plane in space.

In general, the advantages of the Schmidt Optical System in combination with electron tubes is well known and it will be apparent to those skilled in the art that this invention provides an electron optical system which overcomes all effects of optical distortion which may inherently be present therein. Specifically, the lens 16 corrects any distortion occurring by reason of spherical aberration, and the correcting disc 22 corrects any distortion effects resulting from refraction.

It is not intended that this invention shall be limited to the particular type of electron tube illustrated in the drawing, as it will be obvious to those skilled in the art that the optical system provided herein is adaptable to any form of electron tube which either converts a light image into an electron image or converts an electron image into a light image. Thus, the invention is equally applicable to an iconoscope, a dissector, a kinescope or an image-converting tube. The term "image-converting tube" is intended to define electron tubes consisting of a photosensitive electrode adapted to convert optical images, either visible or invisible, into electron images and a light-producing screen responsive to the electron image for reconverting the electron image into a visible or invisible optical image. It is further not intended that this invention shall be limited to the particular form of correcting disc illustrated in the drawing, as it will be obvious to those skilled in the art that many types of discs of graduated thickness may be utilized for correcting the effects of refraction on the optical image transmitted through the envelope of an electron tube.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

I claim:

1. An electron-optical device comprising a cylindrical envelope of light pervious material, an energy-converting electrode within said envelope, a curved mirror surface disposed about the exterior of said envelope for defining a light ray path between said electrode and a point in space at an acute angle with respect to said envelope whereby light rays in said path are subject to refraction between the exterior and interior surfaces of said envelope, and correction means disposed in the light ray path between said mirror and said envelope and comprising a plurality of light refracting discs of graduated diameters, said diameters being proportioned to provide refraction of said light rays in a sense to correct the refraction occurring between the surfaces of said envelope.

2. An electron optical device comprising a cylindrical envelope of light transmitting material, a curved energy-converting electrode within said envelope, a curved mirror surface disposed about the exterior of said envelope to direct light rays at said electrode and through said envelope at an acute angle with respect thereto whereby said rays are subject to refraction between the exterior and interior surfaces of said envelope, and correction means disposed in the light ray path between said mirror and said envelope and comprising a plurality of glass discs of graduated diameters, said diameters being proportioned to provide refraction of said light rays in a sense to correct the refraction occurring between the surfaces of said envelope.

FRANÇOIS CHARLES PIERRE HENROTEAU.

REFERENCES CITED

The following references are of record in the file of this patent:

UNITED STATES PATENTS

| Number | Name | Date |
|---|---|---|
| 2,166,399 | Dowsett et al. | July 18, 1939 |
| 2,298,808 | Ramberg | Oct. 13, 1942 |
| 2,295,779 | Epstein | Sept. 15, 1942 |

FOREIGN PATENTS

| Number | Country | Date |
|---|---|---|
| 373,755 | Germany | Sept. 17, 1922 |